US006954531B2

(12) United States Patent
Sollins

(10) Patent No.: US 6,954,531 B2
(45) Date of Patent: Oct. 11, 2005

(54) SOFTWARE CONTROLLED RING VOLTAGE GENERATOR

(75) Inventor: Michael R. Sollins, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 931 days.

(21) Appl. No.: 09/882,951

(22) Filed: Jun. 15, 2001

(65) Prior Publication Data

US 2002/0191780 A1 Dec. 19, 2002

(51) Int. Cl.[7] .................................................. H04M 3/00

(52) U.S. Cl. ....................... 379/418; 379/372; 379/377; 379/252

(58) Field of Search ................................ 379/418, 252, 379/372, 377

(56) References Cited

U.S. PATENT DOCUMENTS 5,406,623 A * 4/1995 Rovik ........................ 379/418

* cited by examiner

*Primary Examiner*—Jefferey F. Harold
(74) *Attorney, Agent, or Firm*—Fogg and Associates, LLC; Laura A. Ryan

(57) ABSTRACT

A ring voltage generator uses values stored in random access memory to generate a train of pulses used to drive a voltage waveform to ring a telephone ringer. The values are stored in RAM, and are programmable by a user without requiring a change in the ring voltage generator design.

21 Claims, 2 Drawing Sheets

SOFTWARE CONTROLLED RING VOLTAGE GENERATOR

The present invention relates generally to telecommunications, and more specifically to a ring voltage generator for a telephone.

BACKGROUND

Telephones are an integral part of a global communications network that is continually expanding and evolving. The telephone is used every day for important communications between members of an organization, as a communication medium between businesses, and the like. It is essential that telephones be able to alert the users when they are to be used. This is accomplished in most instances by the use of a ringer. The ringer is activated by a ring voltage generator which provides a voltage to the ringer to activate it. Typical ring voltage generation involves a waveform such as a sinusoid which operates at a specific frequency and in a specific defined voltage range.

In order to properly activate the ringer of a specific telephone, the ring voltage generator must provide the proper waveform at the proper frequency. To this end, with the increasingly digital nature of communications, typical ring voltage generators generate the desired waveforms through the use of a digital circuit which reads a set of digital values. Such values are specific to a type of telephone, and depend upon frequency, voltage, and the like. Also, many typical telephone systems respond better to waveforms which differ in some aspects from traditional sinusoidal waveforms. Different telephones need different wave shapes. In other words, each telephone system may require modification of a standard waveform in order to properly operate.

The digital values for generating a ring voltage waveform are typically hard coded into the design of the waveform generator, that is, each telephone system has its own specific design including a specific waveform. When standard ring voltage generators generate the waveform indicated by the telephone as the proper waveform, in some instances, the standard waveform is not capable of activating the phone ringer due to differences between a standard waveform and the actual waveform required to activate the ringer. When this happens, the only way to fix the problem with the inability to generate the ring voltage waveform is to physically have the telephone and the ring voltage generator together, and to modify the design of the ring voltage generator. This is tedious and expensive, since the waveform is hard coded into the design of the ring voltage generator. To change the waveform, a new design for the ring voltage generator must be developed.

Therefore, there is a need in the art for a ring voltage generator that is adaptable to different telephones, ring voltage activation waveforms and the like. There is a further need for such a ring voltage generator that is capable of adjustment without a full redesign.

SUMMARY

In one embodiment, a ring voltage generator includes a first counter connectable to an external clock, to generate a frequency signal, a microprocessor interface connectable to a microprocessor, a multiplexer to selectively pass the frequency signal from the first counter or a programming signal from the microprocessor interface, a random access memory to store a set of values to generate a ring voltage waveform, and a second counter to receive values from the RAM and to generate an output pulse train representative of the values.

In another embodiment, a ring voltage generator includes a random access memory for storing a series of values indicative of pulse frequency, a rate counter to generate a count signal at a predetermined ringer frequency from an external clock, a random access memory to store a set of values for generation of a ring voltage waveform, and a pulse width modulator counter connected to receive data values from the RAM, the PWM counter to generate a pulse train to control a ringer.

In another embodiment, a method includes programming a set of ring voltage values in random access memory (RAM), reading the values into a counter, and generating a pulse train indicative of the values as a ring voltage waveform.

In yet another embodiment, a method includes programming a random access memory (RAM) with a set of values usable to generate a ring voltage waveform, and generating a ring voltage waveform from the set of values.

In still another embodiment, a method includes dividing a received clock to a standard ringer frequency, dividing the standard ringer frequency output, clearing a flip flop that generates an output signal, generating a signal indicative of a programming mode or an operating mode, writing a set of ringer voltage values to a random access memory if the signal indicates a programming mode, sequentially reading a set of ringer voltage values into a counter if the signal indicates an operating mode, and generating a train of output pulses corresponding to a ring voltage waveform from the counter if the signal indicates an operating mode.

Other embodiments are described and claimed.

DETAILED DESCRIPTION

In the following detailed description of the embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention.

Figure 1:
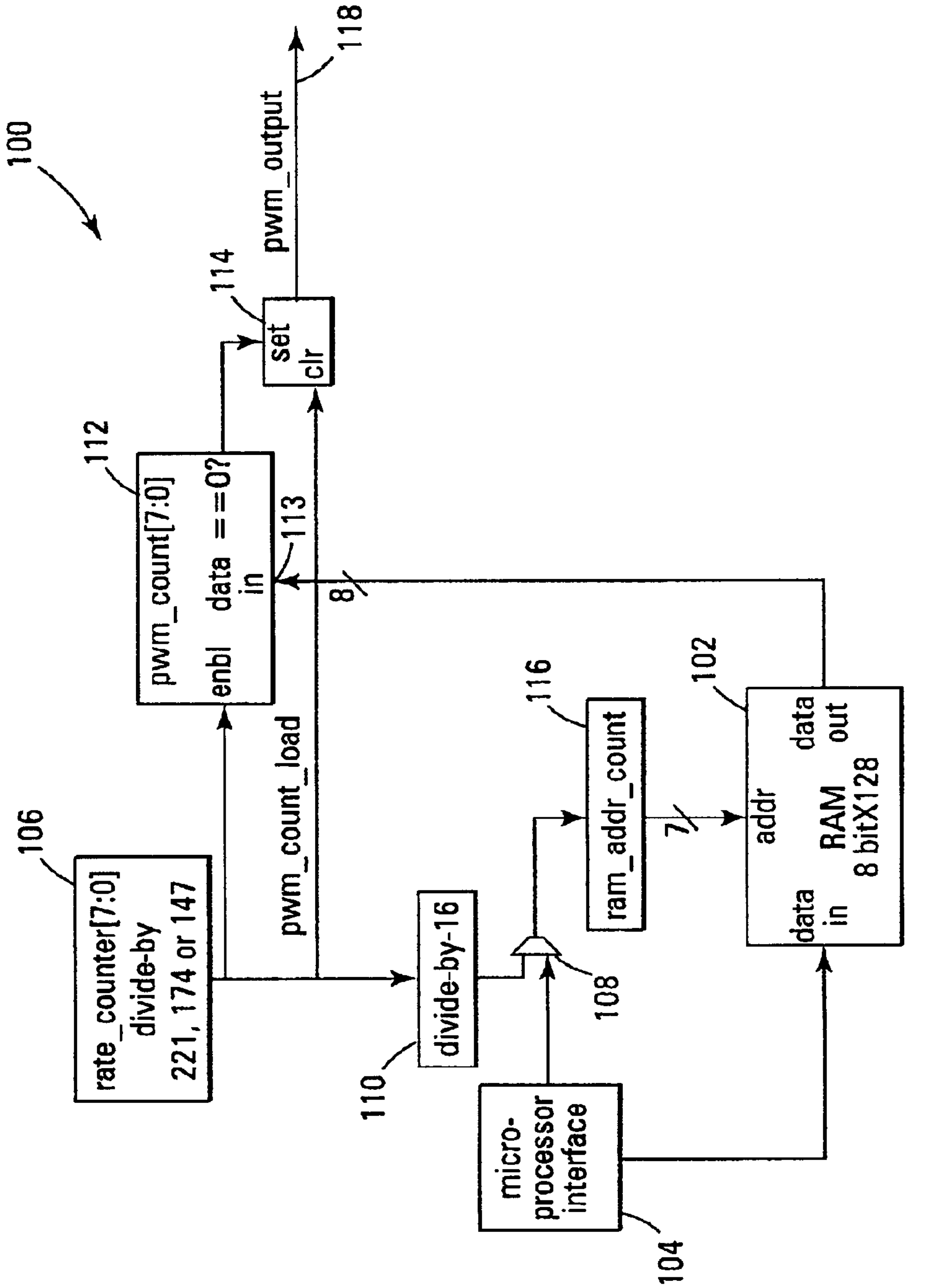
FIG. 1 is a block diagram of a circuit according to one embodiment of the present invention.

FIG. 1 is a block diagram of a circuit 100 according to one embodiment of the present invention. Circuit 100 comprises random access memory 102, a microprocessor interface 104, a rate counter 106, a multiplexer 108 to select between the microprocessor interface 104 and a divider 110, a pulse width modulator counter 112, and an output flip flop 114.

In one embodiment, the RAM 102 stores a series of digital values representative of a desired waveform pattern. The stored values can be programmed to represent nearly any shape of digital waveform desired, from sinusoidal to step, sawtooth, and the like. Such programming is accomplished in one embodiment through an external microprocessor that writes a desired set of values to the RAM 102 through the microprocessor interface 104 and multiplexer 108. The microprocessor interface 104 is used to program the RAM 102 with the values that will be used during the process of generating a ring voltage waveform for the specific telephone or telephone system to which it is connected.

The multiplexer 108 selects from one of two signals, that from the microprocessor interface 104 for programming operation, and that from a divided down rate counter 106 in normal operation. The rate counter 106 accepts a clock input for the clock that runs the circuit 100. Circuit 100 in one embodiment is part of an application specific integrated circuit (ASIC). In other embodiments, the circuit 100 is part of a field programmable gate array (FPGA), a telephone system, or the like.

The rate counter 106 accepts the clock input, and divides it in one embodiment by one of three values depending upon the desired ringer frequency. The values are chosen to allow the known frequency of the input clock to be reduced down to a desired ringer frequency, in various embodiment 20, 25, or 30 Hertz (Hz). The resulting pulse loads the PWM counter 112, and resets the flip flop 114. The pulse from the rate counter 106 is presented to divider 110 and is divided down by 16 in one embodiment to bring the frequency of the rate counter clock down to a usable frequency for the circuit 100.

In normal ringing operation, the multiplexer 110 selects the output from divider 110 and passes it to RAM address counter 116. The resulting output from RAM address counter 116 provides the address for data to be read out of RAM 102 into PWM counter 112. The range of addresses at which data is stored corresponds to one full cycle of the generated waveform. In other embodiments, symmetry of a desired waveform is exploited to reduce the usage of the RAM to, for example, store half or even a fourth of the waveform in the RAM. In these configurations, a tradeoff is made between a smaller amount of RAM and more complex address generation logic.

Values are read out of the RAM 102 sequentially into the data input 113 of the PWM counter 112. This counter 112 is enabled by the rate counter 106 as described above. When data is input from the RAM 102 to the PWM counter 112, the value read into the data input 113 is counted down until it reaches zero. For the time that the counter 112 is counting down to zero, the PWM counter 112 outputs a signal to flip flop 114 that forces or keeps the PWM output signal 118 low. When the counter reaches zero, the flip flop 114 is directed to set the PWM output signal 118 high. New data read into the PWM counter 112 via rate counter 106, divider 110, RAM address counter 116 and RAM 102 resets the flip flop 114 to a low signal. As a result, the PWM output 118 is a train of pulses the spacing of which corresponds to the value read out of RAM 102.

The width between pulses in the output signal 118 PWM counter 112 and flip flop 114 determines the frequency of the pulses in the PWM output signal 118 that correspond to the ringer waveform. Each of the pulse trains is generated 16 times in succession for each value in the RAM 102. The spacing of the pulses determines the values of the generated ringer voltage control signal. As pulse density increases, that is the higher the density of pulses, the higher the voltage in the waveform.

In one embodiment, a ring generator serves 24 subscriber lines. The generator is located on a line card that is common to three eight-line channel cards. The ringer voltage waveform for each of the lines is identical. The embodiments of the present invention allow tuning the ringer voltage waveform for the 24 subscriber lines as one.

The various embodiments of the present invention allow the modification and manipulation of the waveform to be accomplished through easily accessible software which is programmable at a location without requiring a redesign of the device. An external microprocessor has access to the RAM 102 of the embodiments to allow the microprocessor to program values into the RAM that are specific for the appropriate ring voltage waveform desired. Therefore, the embodiments of the present invention have use on multiple telephones and are programmable in the field to operate with multiple different telephones. Further, given experience with such a device, the actual program values that are loaded into the RAM 102 are in one embodiment adjusted by a user to increase ringer reliability.

In operation, an incoming clock signal presented to the rate counter 106 is divided down to correspond to one of the frequency choices for standard telephone ring voltage generators. The choice of divide down is made to divide the known clock frequency to a known desired ring voltage generator frequency, and will depend on the clock voltage. In one embodiment, the clock presented to the rate counter is the clock that is used to operate the entire device into which the present invention circuit is integrated, such as an ASIC. In another embodiment, the present invention circuit stands alone as an input to a digital subscriber loop system.

The output of the circuit 100 is a train of pulses. The output drives a controllable power supply in which the density of pulses translates to an output voltage. As the density of the pulses increases, the generated output voltage increases. Therefore, the generated voltage is controlled by the output from the PWM counter 112. When there are no pulses, the generated voltage is at its lowest level. When the generated pulses are very close together, close enough to replicate a continuous "on" pulse, the generated voltage level is at its peak value.

The PWM counter 112 accepts inputs from the RAM, and uses the RAM values to generate the pulse train that corresponds to the PWM output signal 118. The PWM counter 112 uses as its input in one embodiment a series of data from the RAM. The data is clocked out of the RAM 102 by RAM address counter 116 and rate counter 106. The data from RAM 102 is presented to PWM counter 112. The value read into the PWM counter 112 is counted down from the read in value to zero by the counter. The PWM output from flip flop 114 is reset when the PWM counter 112 is loaded with a value from RAM 102. When the PWM counter counts down to zero, the flip flop 114 is set high. The lip flop is reset low again when another value is read into the PWM counter 112. The PWM output is therefore a train of pulses. Where the pulses are closely spaced, the RAM values are small, and the generated output voltage will be high. When the pulses are spaced further apart, the RAM values are larger, and the generated output voltage is smaller.

RAM address counter 116 runs at one sixteenth the rate of the PWM counter 112, so that each value read out of RAM 102 into PWM counter 112 is used sixteen times in succession. Therefore, each train of pulses for a particular RAM value is sixteen pulses long. The value from the RAM 102 loaded into the PWM counter 112 sets the interval between pulses of the PWM output stream.

The period for running through a read out of all the values from the RAM 102 corresponds to the period of the desired output waveform. The full extent of the RAM 102 is accessed during a single period of the output waveform.

A microprocessor interface 104 is used to load values into the RAM, and to load different values into the RAM for different desired output waveforms and for adjustments to existing loaded RAM value patterns. Multiplexer 108 selects the input to the RAM address counter 116 to determine the operation of the RAM. In a programming mode where values are being stored in the RAM 102, the multiplexer 116 selects the microprocessor interface 104 as the RAM address counter 116 input. In normal operation, the multiplexer 116 selects the output from divider 110 as the RAM address counter 116 input.

In one embodiment, the RAM 103 is an 8-bit RAM storing 128 values. Due to the use of the circuit 100 for multiple different frequencies and outputs, the entire depth of the RAM 102 is not used. The actual number of values stored in the RAM 102 will depend upon the input clock frequency and the dividing ratio between the input clock frequency and a divider such as those in the rate counter 106 and the divider 110. In many embodiments, the RAM will have approximately 120–128 values loaded for use in the generation of an output waveform.

Figure 2:
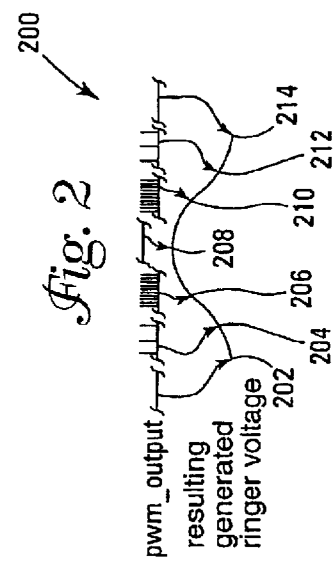
FIG. 2 is a diagram of a waveform generated according to one embodiment of the present invention.

FIG. 2 shows an example of a waveform output 200 generated by circuit 100 using one set of values loaded into RAM 102. The RAM values loaded into RAM 102 for this embodiment generate a sinusoidal output waveform. The PWM output pulses begin with no pulses at point 202, increase to a widely spaced train of pulses at point 204, increase to a closer spaced train of pulses at point 206, and become so closely spaced that they appear to be continuous at point 208. From there, the output pulses decrease at points 210 and 212, and again become nonexistent at point 214. The values loaded into the RAM 102 to produce such a waveform range from a large value at points 202 and 214 to a very small value at the peak of the sinusoid at point 208.

In other embodiments, the values loaded into the RAM 102 through microprocessor interface 104 form other output waveforms such as a sawtooth, a step function, and the like. It should be understood that with on the order of 128 values to be stored in the 8 bit RAM 102, many waveforms are faithfully reproducible. In another embodiment, the depth of the RAM is increased to allow even more values to be stored, to allow the generation of smoother or more complicated waveforms.

Figure 3:
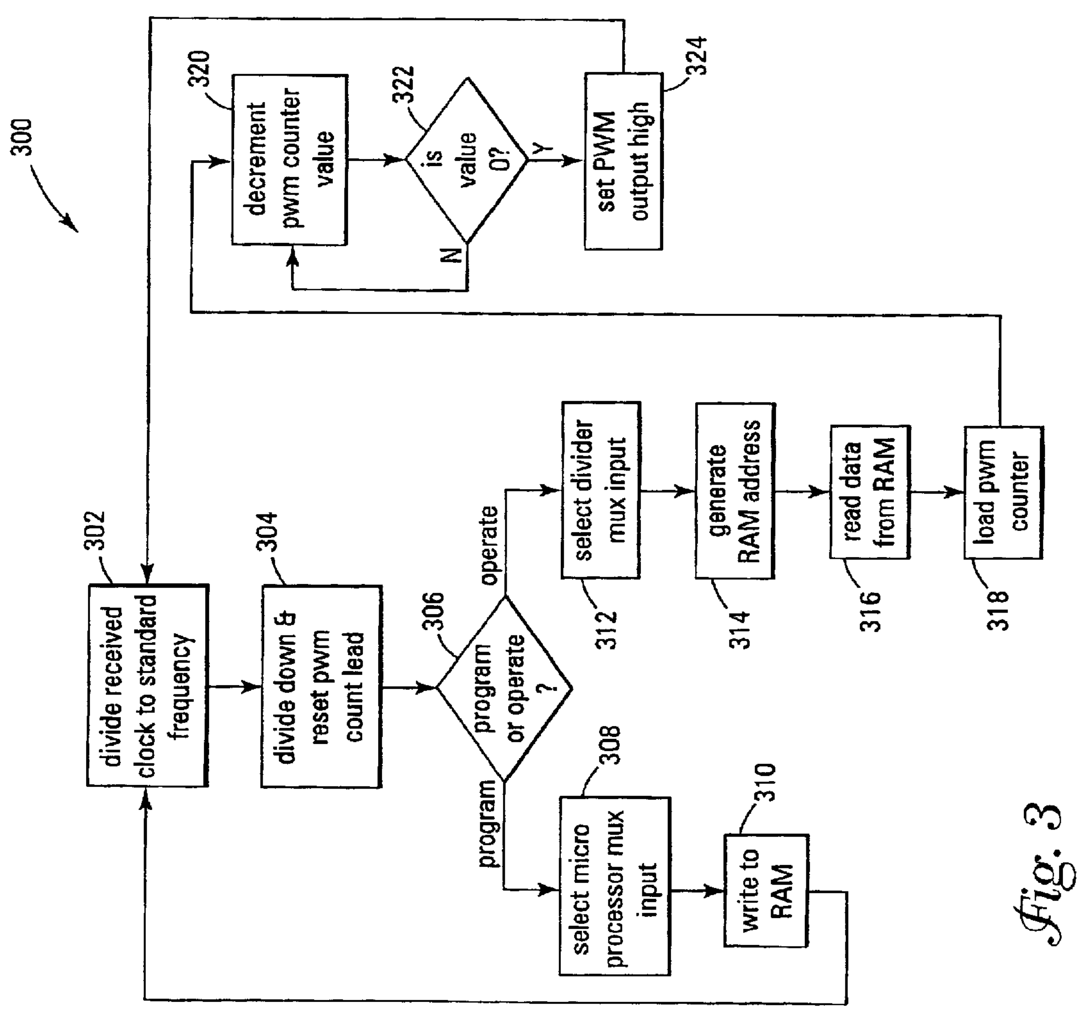
FIG. 3 is a flow chart diagram of a method according to another embodiment of the present invention.

A method 300 of generating a ring voltage waveform is shown in FIG. 3. Method 300 comprises dividing a received clock to a standard ringer frequency in block 302. It should be understood that the received clock signal is in other embodiments already at the desired frequency such that divide down is not necessary. Once the clock is received and divided down, the output is divided down in block 304. At the same time, the output clears flip flop 114 and enables PWM counter 112 to receive data. In decision block 306, it is decided whether the circuit is to be in program mode or in operational mode. If the circuit is to be programmed, multiplexer 108 selects microprocessor interface 104 in block 308, and the RAM is written to with the desired values in block 310. Process flow continues with block 302.

If the circuit is to be operational, multiplexer 108 selects divider input in block 312, the RAM address to be read is generated in block 314, and data is read from the RAM in block 316. The PWM counter 112 is loaded with the read RAM value in block 318. The PWM counter begins counting down the value in block 320. In decision block 322, it is determined whether the PWM counter value is zero. If the value is not zero, process flow continues in block 320. If the PWM counter value is zero, the PWM output is set to high in block 324, and process flow continues in block 302. It should be understood that the process is in various embodiments carried out in a different order, and that such different order is within the scope of the invention.

Figure 4:
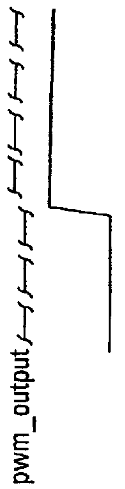
FIG. 4 is a diagram of another representative waveform generated according to another embodiment of the present invention.
Figure 5:
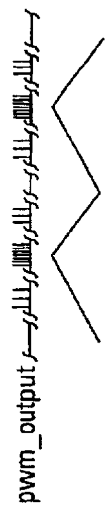
FIG. 5 is a diagram of yet another representative waveform generated according to yet another embodiment of the present invention.

FIGS. 4 and 5 shown representative waveforms that are capable of generation by the circuit and method embodiments of the present invention. FIG. 4 represents a step function. FIG. 5 represents a sawtooth function. The waveforms are shown by way of example only, and not by way of limitation. It should be understood that many different waveforms may be generated by changing the values loaded into the RAM, and that such different waveforms are within the scope of the invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A ring voltage generator, comprising:

a first counter connectable to an external clock, to generate a frequency signal;

a microprocessor interface connectable to a microprocessor;

a multiplexer to selectively pass the frequency signal from the first counter or a programming signal from the microprocessor interface;

a random access memory to store a set of values to generate a ring voltage waveform; and a second counter to receive values from the RAM and to generate an output pulse train representative of the values.

2. The ring voltage generator of claim 1, and further comprising:

a microprocessor interface for programming the RAM.

3. The ring voltage generator of claim 2, and further comprising:

a multiplexer for selectively passing signals from the microprocessor interface or the first counter.

4. The ring voltage generator of claim 1, and further comprising:

a divider between the first counter and the RAM.

5. The ring voltage generator of claim 1, and further comprising:

a third counter between the first counter and the RAM, the third counter operating at a predetermined fraction of the first counter.

6. The ring voltage generator of claim 1, and further comprising:

a flip flop to latch the output of the second counter.

7. A ring voltage generator, comprising:

a random access memory (RAM) for storing a series of values indicative of pulse frequency;

a rate counter to generate a count signal at a predetermined ringer frequency from an external clock; and a pulse width modulator counter connected to receive data values from the RAM, the PWM counter to generate a pulse train to control a ringer.

8. The ring voltage generator of claim 7, and further comprising:

a flip flop to latch the output of the PWM counter.

9. The ring voltage generator of claim 7, and further comprising:

a microprocessor interface;

a multiplexer connected between the microprocessor interface and the RAM and between the rate counter and the RAM, to selectively pass a signal from the microprocessor interface or the rate counter to the RAM.

10. A method, comprising:

programming a set of ring voltage values in random access memory (RAM);

reading out values into a counter;

generating a pulse train indicative of the values as a ring voltage waveform, wherein generating a pulse train comprises:

receiving a RAM value from the RAM;

counting down to zero from the received RAM value; and generating a pulse when the counting down reaches zero, latching pulse output in flip flop; and resetting the flip flop to a low signal catch time a RAM value is received from the RAM.

11. The method of claim 10, wherein reading out values into a counter comprises:

dividing an external clock to obtain a signal at a frequency of a ringer;

generating a RAM address in a RAM address counter from the signal; and accessing the ring voltage value at the generated address.

12. The method of claim 10, and further comprising:

dividing the signal again to obtain a second reduced frequency; and accessing the ring voltage value at the generated address a plurality of times in succession.

13. The method of claim 10, and further comprises:

counting down catch received RAM value a predetermined number of times before receiving another RAM value.

14. A method, comprising:

programming a set of ring voltage values in random access memory (RAM);

reading out values into a counter;

generating a pulse train indicative of the values as a ring voltage waveform; and reprogramming at least a portion of the set of ring voltage values to adjust the ring voltage waveform.

15. A method, comprising:

programming a set of ring voltage a values in randown access memory (RAM);

reading out values into a counter;

generating a pulse train indicative of the values as a ring voltage waveform; and reprogramming at least a portion of the set of ring voltage values to adjust the ring voltage waveform.

16. The method of claim 15, wherein reprogramming comprises:

blocking the signal at the frequency of the ringer; and passing a reprogramming signal through a microprocessor interface to the RAM.

17. A method, comprising:

programming a random access memory (RAM) with a set of values to generate a ring voltage waveform;

generating a ring voltage waveform from the set of values, dividing a received external clock to obtain a frequency corresponding to a ring voltage waveform frequency;

reading the set of values from the RAM;

supplying each of the set of RAM values to a counter sequentially;

counting down in the counter each received RAM value;

generating a digital high pulse when the counter reaches zero; and resetting the pulse to zero before receiving a next RAM value.

18. A method, conspiring:

programming a random access memory (RAM) with a set of values usable to generate a ring voltage waveform;

generating a ring voltage waveform from the set of values; and reading each RAM value a predetermined number of times before reading a next RAM value;

wherein reading each RAM value a predetermined number of times is accomplished with a RAM address counter running at a fraction of the ring voltage waveform frequency.

19. A method, comprising:

dividing a received clock to a standard ringer frequency;

dividing the standard ringer frequency output;

clearing a flip flop that generates an output signal;

generating a signal indicative of a programming mode or an operating mode;

writing a set of ringer voltage values to a random access memory if the signal indicates a programming mode;

sequentially reading a set of ringer voltage values into a counter if the signal indicates an operating mode; and generating a train of output pulses corresponding to a ring voltage waveform from the counter if the signal indicates an operating mode.

20. The method of claim 19, wherein sequentially reading a set of ringer voltage values comprises:

generating a RAM address from the divided standard ringer frequency output; and reading the RAM value at the generated address into the counter.

21. The method of claim 19, wherein generating a train of output pulses comprises:

loading the counter with a read RAM value;

counting down the loaded RAM value to zero; and outputting a pulse when the loaded RAM values is counted down to zero.

* * * * *

UNITED STATES PATENT AND TRADEMARK OFFICE

CERTIFICATE OF CORRECTION

PATENT NO. : 6,954,531 B2
APPLICATION NO. : 09/882951
DATED : October 11, 2005
INVENTOR(S) : Sollins It is certified that error appears in the above-identified patent and that said Letters Patent is hereby corrected as shown below:

At Claim 10, Column 7, Line 23, replace the first occurrence of “catch” with --each--

At Claim 13, Column 7, Line 40, replace the first occurrence of “catch” with --each--

Signed and Sealed this

Eighteenth Day of November, 2008

JON W. DUDAS

*Director of the United States Patent and Trademark Office*